(12) United States Patent
Ma et al.

(10) Patent No.: US 10,432,455 B2
(45) Date of Patent: Oct. 1, 2019

(54) DISTRIBUTED PROCESSING SYSTEM, DATA PROCESSING METHOD, AND CONTROL NODE DEVICE

(71) Applicant: Tencent Technology (Shenzhen) Company Limited, Shenzhen (CN)

(72) Inventors: Jingbo Ma, Shenzhen (CN); Zeliang Pei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/962,653

(22) Filed: Apr. 25, 2018

(65) Prior Publication Data

US 2018/0241623 A1    Aug. 23, 2018

Related U.S. Application Data

(63) Continuation of application No. PCT/CN2017/083171, filed on May 5, 2017.

(30) Foreign Application Priority Data

May 9, 2016 (CN) .......................... 2016 1 0303417

(51) Int. Cl.
*H04L 12/24* (2006.01)
*H04L 12/26* (2006.01)
(Continued)

(52) U.S. Cl.
CPC ............ *H04L 41/0803* (2013.01); *G06F 9/46* (2013.01); *H04L 43/08* (2013.01); *H04L 63/10* (2013.01);
(Continued)

(58) Field of Classification Search
CPC ..... H04L 41/0803; H04L 43/08; H04L 63/10; H04L 67/10; H04W 4/21
See application file for complete search history.

(56) References Cited

U.S. PATENT DOCUMENTS

2004/0063405 A1* 4/2004 Song ................. H04B 7/15
2015/0333978 A1   11/2015 Wu

FOREIGN PATENT DOCUMENTS

CN    102063330 A    5/2011
CN    102360310      2/2012
(Continued)

OTHER PUBLICATIONS

International Search Report with English translation, issued in International Application No. PCT/CN2017/083171, dated Jul. 7, 2017, pp. 1-5, the ISA State Intellextual Property Office of the P.R. China No. 6, Beijing, China.
(Continued)

*Primary Examiner* — Ronald B Abelson
(74) *Attorney, Agent, or Firm* — Brinks Gilson & Lione (57) ABSTRACT

System and methods for distributed processing are provided. The distributed processing system may include a control node, a first computing node, and a second computing node. The control node may obtain a type and a characteristic identifier of to-be-processed characteristic data. The type may be used to identify a home computing node to process to-be-processed characteristic data. The home computing node may be an identified one of the first computing node or the second computing node. The control node may determine process index information based on the characteristic identifier. The control node may schedule data index information corresponding to the to-be-processed characteristic data to a processing process on the home computing node according to the process index information. The data index information may be used for instructing the home computing node (Continued)

node to obtain the to-be-processed characteristic data so that the home computing node may processes the to-be-processed characteristic data.

20 Claims, 3 Drawing Sheets

(51) Int. Cl.
    *H04L 29/06* (2006.01)
    *H04L 29/08* (2006.01)
    *H04W 4/21* (2018.01)
    *G06F 9/46* (2006.01)
(52) U.S. Cl.
    CPC ............... *H04L 67/10* (2013.01); *H04W 4/21* (2018.02); *H04L 63/20* (2013.01)

(56) References Cited

FOREIGN PATENT DOCUMENTS

| | | |
|---|---|---|
| CN | 102904919 | 1/2013 |
| CN | 103455633 | 12/2013 |
| CN | 103973803 | 8/2014 |
| CN | 104077188 A | 10/2014 |

OTHER PUBLICATIONS

Office Action dated Mar. 25, 2019 for Chinese Application No. 201610303417.4, 7 pages.

\* cited by examiner

DISTRIBUTED PROCESSING SYSTEM, DATA PROCESSING METHOD, AND CONTROL NODE DEVICE

RELATED APPLICATION

This application is a continuation of International Application PCT/CN2017/083171, filed May 5, 2017, which claims priority to Chinese Patent Application No. 201610303417.4, entitled, filed on May 9, 2016, both of which are incorporated herein by reference in their entirety.

FIELD OF THE TECHNOLOGY

This application relates to the field of computer technologies, and specifically relates to a distributed processing system, a data processing method, and a control node device.

BACKGROUND OF THE DISCLOSURE

In the existing technology, a characteristic data processing process may include a single machine which pre-generates a characteristic tree by using characteristic data and then performs calculations by using the characteristic tree as a single unit. Existing solutions to characteristic processing may suffer from long processing durations, limited performance of a single machine, and a low characteristic update speed.

SUMMARY

Embodiments of this application provide a distributed processing system methods. An aspect of this application provides a distributed processing system. The distributed processing system may include a control node, a first computing node, and/or a second computing node. The first computing node may be configured to process characteristic data reported by a terminal and characteristic data allocated by the control node. The second computing node may be configured to process characteristic data generated by the first computing node and the characteristic data allocated by the control node. The control node may obtain a type and a characteristic identifier of to-be-processed characteristic data. The type may be used for identifying a home computing node of the to-be-processed characteristic data. The home computing node may be the first computing node or the second computing node.

The control node may determine process index information according to the characteristic identifier. The process index information may be used for indicating a processing process to which the to-be-processed characteristic data belongs on the home computing node. The control node may schedule data index information of the to-be-processed characteristic data or the to-be-processed characteristic data for processing by the processing process on the home computing node according to the process index information. The data index information may be used for instructing the home computing node to obtain the to-be-processed characteristic data. The home computing node may process the to-be-processed characteristic data to obtain processed characteristic data.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DESCRIPTION OF EMBODIMENTS

In massive data processing, a dimension may include an attribute of a monitored object. For example, the dimension may include a region, an equipment room, an operator, an interface and/or an error code. A characteristic may include an index corresponding to one type of or a combination of a plurality of types of dimensions. A characteristic tree may refer to a piece of directed graph formed by all monitored objects and relationships involved in a process in which monitored objects having a finer monitor granularity are aggregated layer by layer to a monitored object having a coarser granularity according to different rules and/or a service requirements. Calculation of a characteristic tree may include a process of aggregating, layer by layer, lower-layer characteristic data of the characteristic tree in different manners, for example, obtaining the sum, average, or quotient to upper-lower characteristic data in a short amount of time, such as within one minute in some implementations.

One technical advancement provided by the system and methods described below may be that a control node device may utilize distributed processing in which calculation of characteristic data can be implemented without constructing a characteristic tree, thereby reducing processing duration. In addition, when a characteristic tree is utilized, the characteristic tree may not need to be placed, stored, or utilized on a single machine for processing, thereby resolving the problem of limited performance of a single machine. For example, in the system and methods for distributed processing described herein, calculation of characteristic data may be implemented without constructing a characteristic tree, thereby reducing processing time.

While various embodiments are described herein, it will be apparent to those of ordinary skill in the art that many more embodiments and implementations are possible. Accordingly, the embodiments described herein are examples, not the only possible embodiments and implementations.

As described herein, a dimension may refer to an attribute of a monitored object. For example, a dimension may include a region, an equipment room, and an operator. In other examples, a dimension may include an interface, an error code, or the like. A characteristic may refer to an index corresponding to one type dimension or a combination of types of dimensions. The characteristic may be used for monitoring a data organized in a system. The characteristic may include a monitored object integrating a characteristic value and characteristic information. In some examples, the characteristic value may include a set of points per day, such as 1440 points.

As further described herein, a single-machine characteristic may refer to a monitored object having a finest granularity in a system. The single-machine characteristic may be used for identifying characteristic data reported by a single machine. A simple characteristic may refer to data obtained by compounding, according to a specified rule, same characteristics (single-machine characteristics) reported by a plurality of machines, A compound characteristic may refer to data obtained by compounding a plurality of simple characteristics or compound characteristics according to a specified rule. A configuration update system may refer to a distributed cooperative system supporting storage and pulling of massive data and real-time sending of a data update notification to a module having a subscription request.

Figure 1:
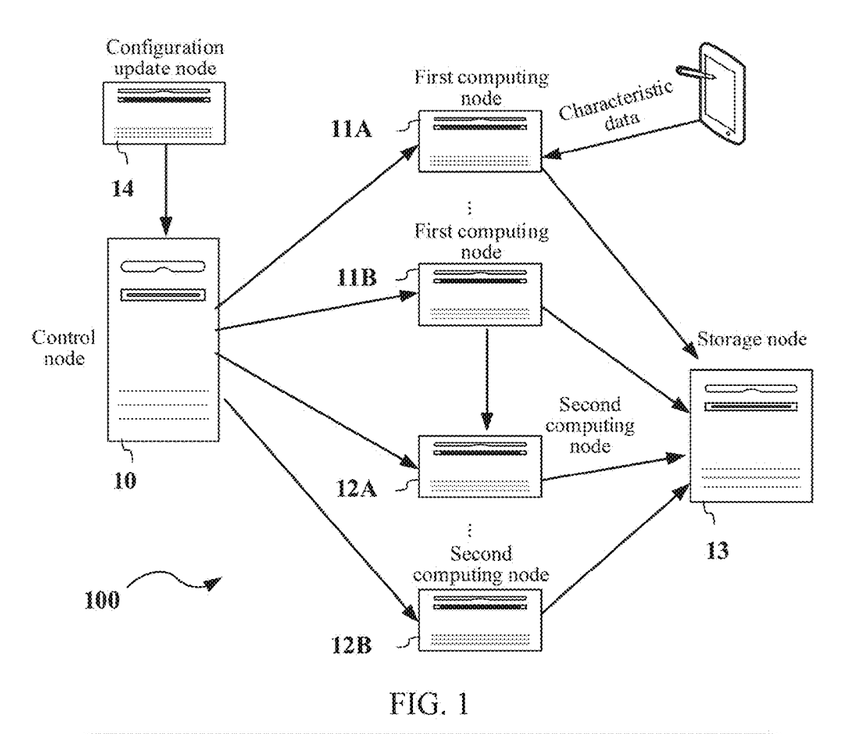
FIG. 1 is a schematic diagram of an embodiment of a distributed processing system according to an embodiment of this application.

Referring to FIG. 1, a distributed processing system 100 provided in an embodiment of this application includes: a control node 10, one or more a first computing nodes 11A-B, one or more second computing nodes 12A-B, a storage node 13, and a configuration update node 14. For example, there may be a plurality of first computing nodes and second computing nodes. The first computing node is configured to process characteristic data reported by a terminal and characteristic data allocated by the control node, and the second computing node is configured to process characteristic data generated by the first computing node and the characteristic data allocated by the control node. That is, the characteristic data reported by the terminal may be equivalent to single-machine characteristic data, and may be directly processed by the first computing node. Simple characteristic data may be obtained after the processing. The first computing node may further transmit the simple characteristic data to the second computing node for further processing. Compound characteristic data is obtained after the simple characteristic data is processed by the second computing node. The second computing node may subscribe for content of the first computing node, so that after obtaining the simple characteristic data through calculation, the first computing node transmits the simple characteristic data to the corresponding second computing node according to the subscription from the second computing node.

The control node is a control center in the distributed processing system in this application, and can learn in time, when a configuration update node detects that to-be-processed characteristic data is updated, updated characteristic information. The updated characteristic information may include a type and a characteristic identifier of the to-be-processed characteristic data. The type of the to-be-processed characteristic data is used for identifying a home computing node of the to-be-processed characteristic data. That is, in this application, the characteristic data on the control node may be divided into two types: simple characteristic data and compound characteristic data. If the type indicates that the to-be-processed characteristic data belongs to the simple characteristic data, it can be determined that the to-be-processed characteristic data is to be processed by the first computing node. If the type indicates that the to-be-processed characteristic data belongs to the compound characteristic data, it can be determined that the to-be-processed characteristic data is to be processed by the second computing node. In fact, a plurality of characteristic processing processes runs on each first computing node and each second computing node. Characteristic data processed in each process may be different. Therefore, process index information may be determined according to the characteristic identifier of the to-be-processed characteristic data. Specifically, there is a correspondence between a characteristic identifier and process index information. Therefore, the process of determining process index information according to the characteristic identifier of the to-be-processed characteristic data may include: determining the process index information corresponding to the characteristic identifier of the to-be-processed characteristic data according to the correspondence. Optionally, the process index information corresponding to the characteristic identifier may be calculated according to the characteristic identifier of the to-be-processed characteristic data by using a consistent hashing algorithm. The process index information is used for indicating a processing process to which the to-be-processed characteristic data belongs on the home computing node. Routing information of the data index information or the to-be-processed characteristic data may be determined according to the process index information, or in other words, a process to which the data index information or the to-be-processed characteristic data should be scheduled may be determined.

The control node schedules data index information of the to-be-processed characteristic data or the to-be-processed characteristic data to the processing process on the home computing node according to the process index information, and the data index information is used for instructing the home computing node to obtain the to-be-processed characteristic data.

The home computing node processes the to-be-processed characteristic data to obtain processed characteristic data.

The control node receives, when the configuration update node detects that the characteristic data is updated, the type and the characteristic identifier of the to-be-processed characteristic data that are reported by the configuration update node.

Alternatively, when determining that a process on the first computing node or the second computing node is abnormal, the control nodes obtains a type and a characteristic identifier of characteristic data processed in the abnormal process, as the type and the characteristic identifier of the to-be-processed characteristic data.

In fact, the main principle of the distributed processing system in this application is dividing all characteristics in the system into a simple type and a compound type. A rule of distributing the to-be-processed characteristic data is configured on the control node. The distribution rule specifies a process of determining a process to which the characteristic data belongs. For example, the characteristics in the system are mainly divided into two types: simple characteristics and compound characteristics. A single-machine characteristic is a subset of the simple characteristics. The simple characteristics are calculated directly according to data reported by a user. The compound characteristics are calculated directly according to the simple characteristics or compound characteristics.

First, a type of a calculation node for calculating the to-be-processed characteristic data is determined according to a characteristic type, that is, whether the to-be-processed characteristic data is calculated by the first computing node or the second computing node is determined.

Then, process index information of a routing table corresponding to the characteristic identifier can be obtained by solving a distribution function F. A solving process may be: $x1=F1(X1), \ldots, xn=Fn(Xn)$. $X1, \ldots Xn$ represent characteristic identifiers. The process index information $x1, \ldots xn$ are obtained by solving the distribution function F.

Corresponding routing information is searched for according to the process index information of the routing table corresponding to the characteristic identifier, where r1=R1(x1), r2=R2(x2), . . . rn=Rn(xn). Finally, characteristics are scheduled to a corresponding process on a corresponding calculation node in real time according to the obtained routing information.

After determining the process to which the to-be-processed characteristic data should be scheduled, the control node schedules the data index information of the to-be-processed characteristic data or the to-be-processed characteristic data to the corresponding process for calculation.

The second computing node subscribes, in each minute, for a characteristic used for calculation performed by itself on the first computing node or another second computing node. When the data reported by the user reaches the first computing node, after finishing calculation, the first computing node actively pushes the data to a corresponding second computing node according to the subscription from the second computing node. When simple characteristic data or compound characteristic data for calculating each compound characteristic reaches the second computing node, the second computing node starts to calculate the compound characteristic data. The process is repeated in every minute. When a quantity of characteristics increases, a quantity of machines is increased.

The process of calculating characteristic data by the first computing node is simple characteristic calculation, and the process of calculating characteristic data by the second computing node is compound characteristic calculation.

1) Simple characteristic calculation: $S([Sx1, Sx2, \ldots Sxn])=>[S1, S2, \ldots Sn]$. S is a simple characteristic calculation function, and $S1, S2, \ldots Sn$ are calculated characteristic values of each simple characteristic within a time period.

2) Compound calculation:

$$C([S1,S2, \ldots Sn])=>[C1,C2, \ldots Cn] \text{ or}$$
$$C([C1,C2, \ldots Cn])=>[C1',C2', \ldots Cn']$$

C is a compound characteristic calculate function. $C1, C2, \ldots Cn$ are compound characteristic values obtained through calculation according to a plurality of simple characteristic values, and $C1', C2', \ldots Cn'$ are current compound characteristic values obtained through calculation according to the compound characteristic values.

Figure 2:
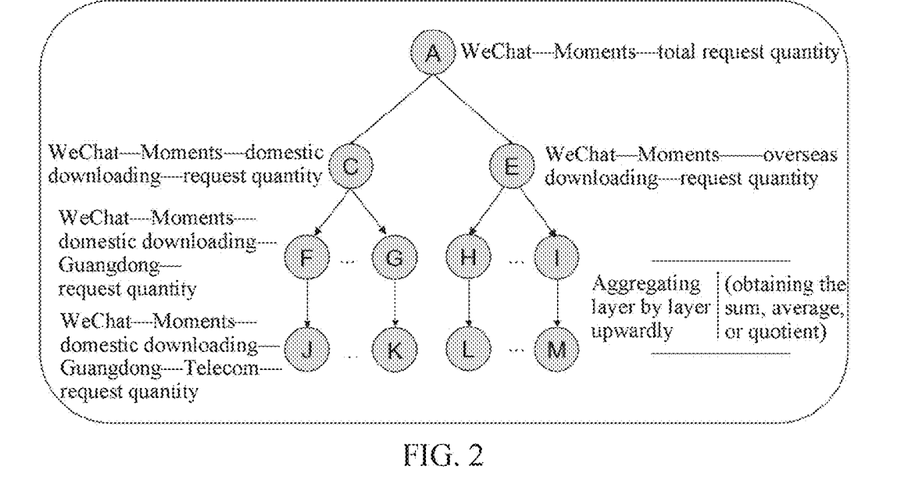
FIG. 2 is a schematic diagram of an example of processing characteristic data by using a distributed processing system according to an embodiment of this application.

For ease of understanding, the foregoing process is described by using an example with reference to FIG. 2.

An example is used in which the characteristic data is a WeChat—Moments—request quantity. To count the WeChat—Moments—request quantity, a WeChat—Moments—request quantity of Mobile users, a WeChat—Moments—request quantity of Unicom users, and a WeChat—Moments—request quantity of Telecom users in each province of each nation may be counted first. The characteristic data belongs to simple characteristic data, and can be obtained by calculating the sum. A WeChat—Moments—request quantity of Mobile users in Guangdong is used as an example for description. The example may be: A quantity of Mobile users sending a Moments request is scheduled to a process on the first computing node for counting. Likewise, a WeChat—Moments—request quantity of Unicom users in Guangdong and a WeChat—Moments—request quantity of Telecom users in Guangdong may be counted by using another two processes. Certainly, numerical values of this type of another province may be calculated by using another process. Then, the simple characteristic data is sent to a corresponding process that is on the second computing node and that is used for calculating a WeChat—Moments—request quantity in a domestic province. In this way, domestic data can be calculated. Characteristic data overseas may also be processed by using the foregoing method, and a global WeChat—Moments—request quantity can be finally determined.

In this application, the characteristic data needs to be correspondingly stored after being processed. A storage format provided in this application adopts a value structure. The value structure is version number+bitmap identifier+dynamic data content. For details of the format, refer to FIG. 3 for understanding.

Figure 3:
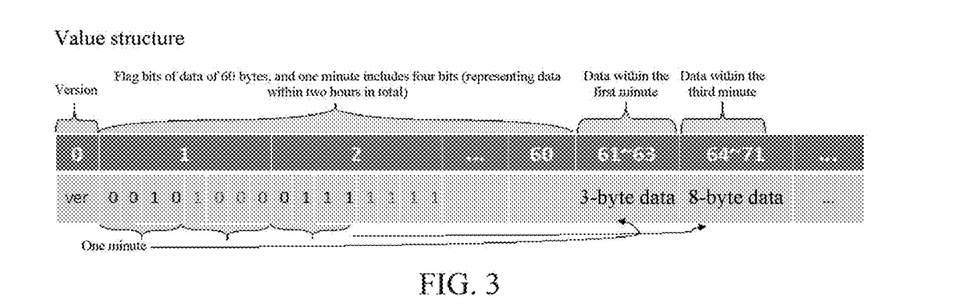
FIG. 3 is a schematic diagram of a data storage structure according to an embodiment of this application.

As shown in FIG. 3, 0 byte ver represents a version number, for example, 1.0. In the last 60 bytes, the first to the sixtieth bytes are bitmap flag bits, and each four bits represents data within one minute. For details of the bitmap flag bits, refer to Table 1. One value may store data within two hours.

TABLE 1

Description of a bitmap flag bit structure

| Bit | | | | Description |
|---|---|---|---|---|
| 1 | 0 | 0 | 0 | 0 value |
| 1 | 0 | 0 | 1 | reserve |
| 1 | 0 | 1 | 0 | reserve |
| 1 | 0 | 1 | 1 | reserve |
| 1 | 1 | 0 | 0 | reserve |
| 1 | 1 | 0 | 1 | reserve |
| 1 | 1 | 1 | 0 | −2 (not calculated) |
| 1 | 1 | 1 | 1 | −1 (not reported) |
| 0 | 0 | 0 | 0 | 1-byte data |
| 0 | 0 | 0 | 1 | 2-byte data |
| 0 | 0 | 1 | 0 | 3-byte data |
| 0 | 0 | 1 | 1 | 4-byte data |
| 0 | 1 | 0 | 0 | 5-byte data |
| 0 | 1 | 0 | 1 | 6-byte data |
| 0 | 1 | 1 | 0 | 7-byte data |
| 0 | 1 | 1 | 1 | 8-byte data |

It can be learned from Table 1 that, a real size of data can be stored only when the characteristic data is greater than 0, and a quantity of bytes stored is determined by an actual quantity of bytes the data has. For example, 32 may be represented by using one byte, so that one byte is stored.

In addition, in this application, an ANM compression algorithm is used, and a compression efficiency may be improved. Table 2 is a comparison among indicators of three types of compression algorithms.

TABLE 2

Compression efficiency comparison

| Compression manner | Quantity of data (B) | Compression duration (S) | Decompression duration (S) | Compression rate (%) |
|---|---|---|---|---|
| ANM | 166125 * 1440 * 8 | 3.113 | 2.157 | 83.5 |
| Snappy | 166125 * 1440 * 8 | 7.724 | 2.798 | 82 |
| Zlib | 166125 * 1440 * 8 | 69.356 | 8.122 | 92 |

It can be learned from Table 2 that, when a same quantity of data is to be compressed, compression duration and decompression duration by using the ANM compression algorithm used in this application are the shortest, and the compression efficiency is much higher than that of the zlib manner in which the compression duration is 69.356.

The ANM, the snappy, and the zlib in Table 2 are three types of data compression algorithms. However, the compression algorithm in this application is not limited thereto.

The configuration update node in FIG. 1 mainly provides rapid pulling, subscription and notification of massive data. The control node subscribes for an update notification on the configuration update node. The configuration update node can notify the control node within seconds when there is any modification of hundreds of millions of data. When the control node only pushes the data index information to the first computing node and the second computing node, specific characteristic data needs to be pulled in real time from the configuration update node.

The control node: The control node is a control center during the entire real-time calculation, and is responsible for pushing full data index information or a part of updated characteristic data to a specified calculation node. A push routing may determine a corresponding calculation process by using consistent hashing algorithm. When the first computing node and the second computing node are abnormal, the control node senses this situation within a time period, such as 30 seconds, and evenly distributes characteristic data in an abnormal process to another process, to ensure that the data is recovered within one minute. In general, an abnormal process may refer to a process in which a measured processing efficiency deviates from a threshold value. For example, hardware executing the processing process and components in which the abnormal processing node access may have a maximum processing capability in terms of throughput, instructions per second, or other processing criteria. The bottlenecks and delays may be caused by, for example, a high influx of characteristic data, variations in bandwidth availability, network outages, increased write operations performed on the storage node, errors, concurrent execution of multiple processes, and/or any other demand on computing resources. In some examples, the control node may calculate an efficiency metric of a computing node. The control node may determine that the processing process on the computing node is abnormal based on the efficiency metric. For example, the efficacy metric may be greater than or less than a threshold value, or fall outside of an expected range.

The first computing node is mainly responsible for: synthesizing a simple characteristic from single-machine characteristics, the calculation being driven by characteristic data, and accepting a subscription request from the second computing node, and pushing data to a specified second computing node in time when calculation of simple characteristic data is finished and there is compound calculation node, that is, when there is a subscription from the second computing node.

In addition, there is a policy for ensuring data security. Currently, both the simple characteristic data and the single-machine characteristic data are saved for two copies, one copy on the first computing node and the other copy on a result data caching node. A specific process for saving is determined according to a routing algorithm. When the first computing node is unexpectedly restarted or expanded, the system actively obtains historical data from a corresponding result data storage node. The characteristic data is stored by compression by using two hours as a data structure. Therefore, data within two hours needs to be complete, to ensure integrity of the data.

When a process, a network, or a machine unexpectedly triggers a redundancy mechanism of a module, a calculation task of the abnormal process is evenly distributed to other processes. Data index information is pushed by the control node. The calculation node actively obtains data from a configuration system. The process is finished within one minute.

The second computing node is mainly responsible for: calculating a compound characteristic, the calculation being driven by time and a round of calculation being performed per minute, and accepting a subscription request of the second computing node itself, and pushing characteristic data to a specified second computing node in time when calculation of compound characteristic data is finished and there is a subscription from another second computing node.

In addition, there is a policy for ensuring data security that is the same as the data redundancy policy of the first computing node.

A redundancy mechanism of the second computing node is also the same as the redundancy mechanism of the first computing node, and for this content, refer to a corresponding part of the first computing node for understanding.

A storage node may include a storage node for caching.

The storage node for caching is mainly responsible for caching data within the latest four hours, data pulling of an external interface, and data localizing storage.

According to the data security policy, the storage node for caching is responsible for: saving calculation results of the first computing node and the second computing node, and providing data that is within two hours to a calculation node when the calculation node is abnormal. The calculation node actively pushes relevant data to the storage node when the calculation node itself is unexpectedly restarted or expanded, to ensure that each data is stored for two copies.

All data used externally is obtained from the storage. When historical data does not exist, data is re-pulled from a storage device and cached.

Because there is a relatively large quantity of data in the system, and there is a relatively high write demand on the storage device, the module slowly localizes data by using the data caching capability. In this way, not only is pressure on an access layer of the storage device reduced, but also there is a redundancy capability facing with an abnormal situation of the storage device.

In this application, the method of breaking up the whole into parts is used, in which a calculation manner using a characteristic tree as a unit is improved to a calculation manner using a single node as a unit, thereby breaking the bottleneck of limited performance of a single machine that limits tree construction. An updated characteristic is allocated in real time to a specified calculation node by means of configuration update, thereby resolving the problem of an excessively long effective time period caused by the quantity of hundreds of millions of characteristic data. By performing classified calculation according to the type of a characteristic, different types of characteristics are decoupled from each other and are prevented from being mutually interfered.

Figure 4:
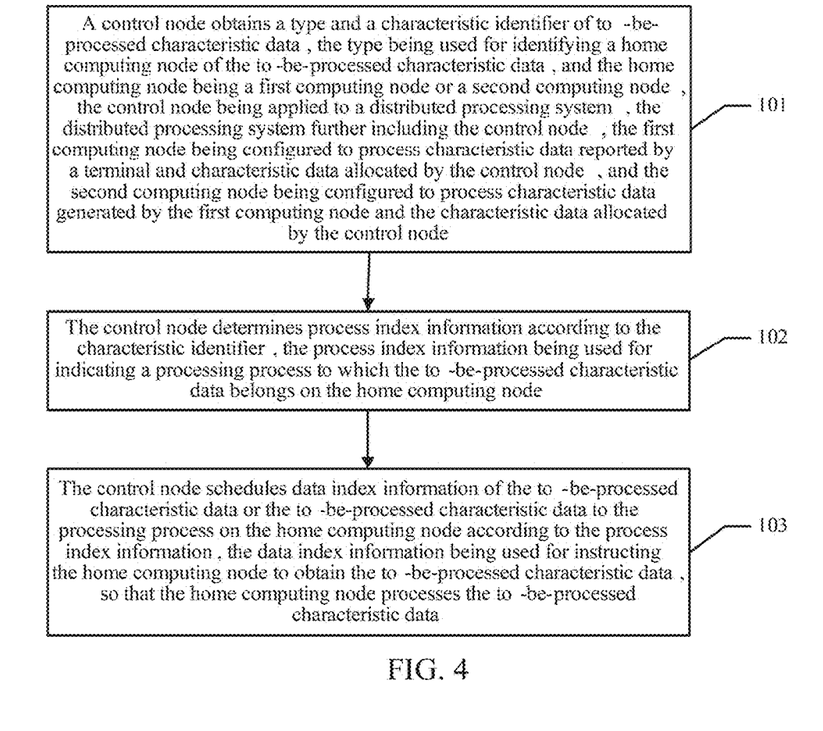
FIG. 4 is a schematic diagram of an embodiment of a data processing method according to an embodiment of this application.

Referring to FIG. 4, an embodiment of a data processing method provided in an embodiment of this application includes:

101: A control node may obtain a type and a characteristic identifier of to-be-processed characteristic data. The type may be indicative of a home computing node of the to-be-processed characteristic data. The home computing node may be one of the first computing node or the second computing node. In other words, at 101, the control node may obtain a type and a characteristic identifier of to-be-processed characteristic data, the type being used for identifying a home computing node of the to-be-processed characteristic data, and the home computing node being the first computing node or the second computing node, the control node being applied to a distributed processing system, the distributed processing system further including the control node, the first computing node being configured to process characteristic data reported by a terminal and characteristic data allocated by the control node, and the second computing node being configured to process characteristic data generated by the first computing node and the characteristic data allocated by the control node.

102: The control node may determine process index information based on the characteristic identifier. The process index information may be indicative of a processing process to which the to-be-processed characteristic data is associated with on the home computing node. In other words, the control node may determine process index information according to the characteristic identifier, the process index information being used for indicating a processing process to which the to-be-processed characteristic data belongs on the home computing node.

103: The control node may schedule data index information corresponding to the to-be-processed characteristic data for processing by the processing process on the home computing node according to the process index information. In other words, the control node may schedule data index information of the to-be-processed characteristic data or the to-be-processed characteristic data to the processing process on the home computing node according to the process index information, the data index information being used for instructing the home computing node to obtain the to-be-processed characteristic data, so that the home computing node processes the to-be-processed characteristic data. In some examples, the control node may cause, based on the scheduled data index information, the home computing node to process the to-be-processed characteristic data to obtain processed characteristic data.

Compared with the characteristic tree processing solution in the existing technology having the problems of having long processing duration and limited performance of a single machine, the data processing method provided in this embodiment of this application adopts a distributed processing manner, in which calculation of characteristic data can be implemented without constructing a characteristic tree, thereby reducing the processing duration. In addition, the characteristic tree does not need to be placed on a single machine for processing, thereby resolving the problem of limited performance of a single machine.

In an embodiment, the distributed processing system further includes a configuration update node, the configuration update node being configured to: store the to-be-processed characteristic data reported by the terminal and monitor update of the to-be-processed characteristic data.

The control node is further configured to receive, when the configuration update node detects that the to-be-processed characteristic data is updated, the type and the characteristic identifier of the to-be-processed characteristic data that are pushed by the configuration update node.

In an embodiment, the first computing node is configured to process the characteristic data reported by the terminal and the characteristic data allocated by the control node; and push the processed characteristic data to the second computing node according to a subscription request of the second computing node.

In an embodiment, the distributed processing system includes a plurality of second computing nodes.

One of the plurality of second computing nodes is configured to: process the characteristic data pushed by the first computing node and the characteristic data allocated by the control node; and push the processed characteristic data to another second computing node according to a subscription request of the another second computing node.

In an embodiment, the control node is further configured to obtain, when determining that the processing process on the home computing node is abnormal, a type and a characteristic identifier of characteristic data processed in the abnormal processing process, as the type and the characteristic identifier of the to-be-processed characteristic data. For example, the control node may determine that the processing process on the home computing node is abnormal based on a measured efficiency of the home computing node. In response, the control node may obtain the type and the characteristic identifier of characteristic data associated with the processing process. Alternatively or in addition, the control node may schedule the data index information corresponding to the to-be-processed characteristic data for processing by a separate processing process on the second computing node according to the process index information. The control node may cause, based on the data index information, the second computing node to process the to-be-processed characteristic data to obtain processed characteristic data.

In an embodiment, the control node may be further configured to determine, according to a correspondence between a characteristic identifier and process index information, the process index information corresponding to the characteristic identifier. For example, the control node may identify a correspondence between the characteristic identifier and the process index information. In response, to identification of the correspondence, the control node may select the process index information corresponding to the characteristic identifier.

In an embodiment, the distributed processing system further includes a storage node, configured to store the processed characteristic data. The stored characteristic data may include a data storage format of a version number, bit information, and data content. The characteristic data may be organized on the storage node based on the data storage format.

In this application, for the data processing method, refer to a corresponding part of the distributed processing system for understanding, and details are not described herein again.

Figure 5:
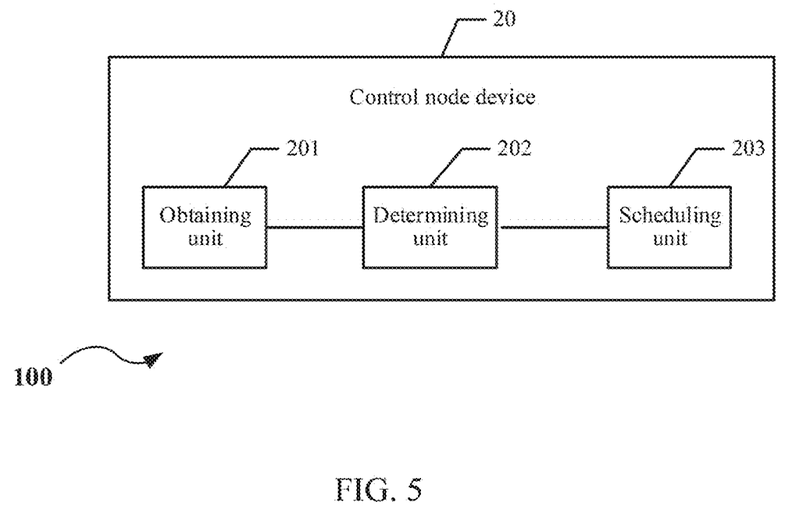
FIG. 5 is a schematic diagram of an embodiment of a control node device according to an embodiment of this application.

Referring to FIG. 5, a control node device 20 provided in an embodiment of this application is applied to a distributed processing system. The distributed processing system further includes a first computing node and a second computing node, the first computing node being configured to process characteristic data reported by a terminal and characteristic data allocated by the control node, and the second computing node being configured to process characteristic data generated by the first computing node and the characteristic data allocated by the control node. The control node device includes:

an obtaining unit 201, configured to obtain a type and a characteristic identifier of to-be-processed characteristic data, the type being used for identifying a home computing node of the to-be-processed characteristic data, and the home computing node being the first computing node or the second computing node;

a determining unit 202, configured to determine process index information according to the characteristic identifier obtained by the obtaining unit 201, the process index information being used for indicating a processing process to which the to-be-processed characteristic data belongs on the home computing node; and a scheduling unit 203, configured to schedule data index information of the to-be-processed characteristic data or the to-be-processed characteristic data to the processing process on the home computing node according to the process index information determined by the determining unit 202, the data index information being used for instructing the home computing node to obtain the to-be-processed characteristic data, so that the home computing node processes the to-be-processed characteristic data to obtain processed characteristic data.

Compared with the characteristic tree processing solution in the existing technology having the problems of having long processing duration and limited performance of a single machine, the control node device provided in this embodiment of this application adopts a distributed processing manner, in which calculation of characteristic data can be implemented without constructing a characteristic tree, thereby reducing the processing duration. In addition, the characteristic tree does not need to be placed on a single machine for processing, thereby resolving the problem of limited performance of a single machine.

In an embodiment, the obtaining unit 201 is configured to receive, when the configuration update node detects that the to-be-processed characteristic data is updated, the type and the characteristic identifier of the to-be-processed characteristic data that are pushed by the configuration update node.

In an embodiment, the obtaining unit 201 is configured to obtain, when determining that the processing process on the home computing node is abnormal, a type and a characteristic identifier of characteristic data processed in the abnormal processing process, as the type and the characteristic identifier of the to-be-processed characteristic data.

In an embodiment, the determining unit 202 is configured to determine, according to a correspondence between a characteristic identifier and process index information, the process index information corresponding to the characteristic identifier.

In an embodiment, the processed characteristic data is stored in a data storage format of a version number, bit information, and data content.

In this application, for the control node device, refer to a corresponding part of the control node in the distributed processing system for understanding, and details are not described herein again.

Figure 6:
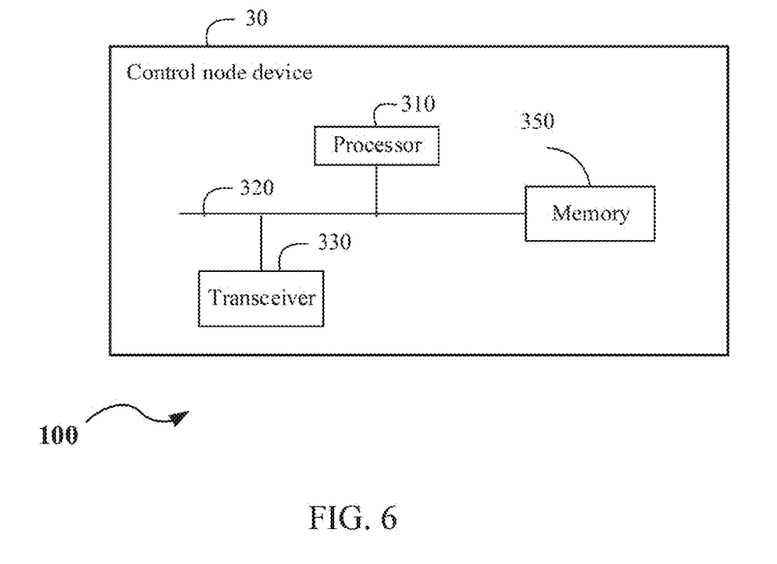
FIG. 6 is a schematic diagram of another embodiment of a control node device according to an embodiment of this application.

FIG. 6 is a schematic structural diagram of a control node device 30 according to an embodiment of this application. The control node device 30 is applied to a distributed processing system. The distributed processing system further includes a first computing node and a second computing node, the first computing node being configured to process characteristic data reported by a terminal and characteristic data allocated by the control node, and the second computing node being configured to process characteristic data generated by the first computing node and the characteristic data allocated by the control node. The control node device 30 includes: a processor 310, a memory 350, and an input/output device 330. The input/output device 330 may include: a mouse, a keyboard, a touchscreen and a display. The memory 350 may include a read-only memory (ROM) and a random access memory (RAM), and provides an operating instruction and data to the processor 310. A part of the memory 350 may further include a non-volatile RAM (NVRAM).

In some implementations, the memory 350 stores the following element: an executable module, or a data structure, or a subset thereof, or an extension set thereof.

In an embodiment of this application, by invoking the operating instruction (the operating instruction may be stored in an operating system) stored in the memory 350, the following operations are implemented:

obtaining a type and a characteristic identifier of to-be-processed characteristic data, the type being used for identifying a home computing node of the to-be-processed characteristic data, and the home computing node being the first computing node or the second computing node;

determining process index information according to the characteristic identifier, the process index information being used for indicating a processing process to which the to-be-processed characteristic data belongs on the home computing node; and scheduling data index information of the to-be-processed characteristic data or the to-be-processed characteristic data to the processing process on the home computing node according to the process index information, the data index information being used for instructing the home computing node to obtain the to-be-processed characteristic data, so that the home computing node processes the to-be-processed characteristic data.

Compared with the characteristic tree processing solution in the existing technology having the problems of having long processing duration and limited performance of a single machine, the control node device provided in this embodiment of this application adopts a distributed processing manner, in which calculation of characteristic data can be implemented without constructing a characteristic tree, thereby reducing the processing duration. In addition, the characteristic tree does not need to be placed on a single machine for processing, thereby resolving the problem of limited performance of a single machine.

The processor 310 controls operation of the control node device 30. The processor 310 may alternatively be referred to as a central processing unit (CPU). The memory 350 may include a ROM and a RAM, and provides an instruction and data to the processor 310. A part of the memory 350 may further include an NVRAM. During specific application, all components of the control node device 30 are coupled by using a bus system 320, and in addition to a data bus, the bus system 320 may further include a power source bus, a control bus, a state signal bus, and the like. For clarity of description, all types of buses in the diagram are marked as the bus system 320.

The methods disclosed in the foregoing embodiments of this application may be applied to the processor 310, or in other words, may be implemented by the processor 310. The processor 310 may be an integrated circuit chip and has a signal processing capability. During implementation, steps of the foregoing methods may be implemented by using a hardware integrated logical circuit in the processor 310, or an instruction in the form of software. The processor 310 may be a general purpose processor, a digital signal processor (DSP), an application-specific integrated circuit (ASIC), a field programmable gate array (FPGA), or another programmable logic component, a discrete gate or a transistor logic device, or a discrete hardware component, and may implement or perform the methods, steps, and logical block diagrams disclosed in the embodiments of this application. The general purpose processor may be a microprocessor, or the processor may alternatively be any conventional processor, or the like. The steps of the methods disclosed in the embodiments of this application may be directly implemented by a hardware decoding processor, or may be implemented by combining hardware and software modules in a decoding processor. The software module may be located in a mature storage medium in the art, such as a RAM, a flash memory, a ROM, a programmable ROM, an electrically erasable programmable memory, or a register. The storage medium is located in the memory 350, and the processor 310 reads information in the memory 350 and performs the steps of the foregoing methods in combination with hardware of the processor.

Optionally, the distributed processing system 100 further includes a configuration update node. The processor 310 is configured to: receive, when the configuration update node detects that the characteristic data is updated, the type and the characteristic identifier of the to-be-processed characteristic data that are pushed by the configuration update node.

Optionally, the processor 310 is configured to obtain, when determining that the processing process on the home computing node is abnormal, a type and a characteristic identifier of characteristic data processed in the abnormal processing process, as the type and the characteristic identifier of the to-be-processed characteristic data.

Optionally, the processor 310 is configured to determine, according to a correspondence between a characteristic identifier and process index information, the process index information corresponding to the characteristic identifier.

For the control node device 30, refer to a corresponding part of the control node in the distributed processing system 100 for understanding, and details are not described herein again.

The control node device 30 may be implemented in many different ways. For example, the processor 310 may be in communication with the memory 350. In one example, the processor 310 may also be in communication with additional elements, such as a transceiver 330. Examples of the processor 310 may include a general processor, a central processing unit, a microcontroller, a server, an application specific integrated circuit (ASIC), a digital signal processor, a field programmable gate array (FPGA), and/or a digital circuit, analog circuit, or some combination thereof. The processor 310 may be one or more devices operable to execute logic. The logic may include computer executable instructions or computer code stored in the memory 350 or in other memory that when executed by the processor 310, cause the processor 310 to perform the features implemented by the logic of the obtaining unit 201, the determining unit 202, the scheduling unit 203, the control node device 30 and/or the distributed processing system 100. The computer code may include instructions executable with the processor 310.

The memory 350 may be any device for storing and retrieving data or any combination thereof. The memory 350 may include non-volatile and/or volatile memory, such as a random access memory (RAM), a read-only memory (ROM), an erasable programmable read-only memory (EPROM), or flash memory. Alternatively or in addition, the memory 350 may include an optical, magnetic (hard-drive) or any other form of data storage device.

The memory 350 may include at least one the obtaining unit 201, the determining unit 202, the scheduling unit 203 and/or any other component of the distributed processing system 100 described herein. In addition, the memory may include any other component previously discussed.

In some examples, the control node device 30, components of the control node device 30 and/or the distributed processing system 100 may include a circuit or circuitry. Each circuit or circuitry may be hardware or a combination of hardware and software. The circuitry may include the obtaining unit 201, the determining unit 202, the scheduling unit 203, the control nod device 20 and/or other components and subcomponents of the distributed system described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 350, for example, that comprises instructions executable with the processor 310 or other processor to implement one or more of the features of the circuitry. When any one of the circuitry includes the portion of the memory that comprises instructions executable with the processor 310, the circuitry may or may not include the processor 310. In some examples, each circuitry may just be the portion of the memory 350 or other physical memory that comprises instructions executable with the processor 310 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the control node device 30 and/or the distributed processing system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

A person of ordinary skill in the art may understand that all or some of the steps of the methods in the foregoing embodiments may be implemented by a program instructing relevant hardware. The program may be stored in a computer readable storage medium. The storage medium may include: a ROM, a RAM, a magnetic disk, an optical disc, or the like.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

All of the discussion, regardless of the particular implementation described, is illustrative in nature, rather than limiting. For example, although selected aspects, features, or components of the implementations are depicted as being stored in memory(s), all or part of the control node device or the control node devices may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of" <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A distributed processing system, comprising: a control node, the control node configured to communicate with a first computing node and a second computing node, the first computing node being configured to process characteristic data reported by a terminal and characteristic data allocated by the control node, and the second computing node being configured to process characteristic data generated by the first computing node and the characteristic data allocated by the control node, the control node comprising a processor, the processor configured to:
    obtain a type and a characteristic identifier of to-be-processed characteristic data, the type indicative of a home computing node of the to-be-processed characteristic data, the home computing node being one of the first computing node or the second computing node;
    determine process index information based on the characteristic identifier, the process index information indicative of a processing process to which the to-be-processed characteristic data is associated with on the home computing node;
    schedule data index information corresponding to the to-be-processed characteristic data for processing by the processing process on the home computing node according to the process index information, the data index information comprising an instruction to cause the home computing node to obtain the to-be-processed characteristic data; and
    cause, based on the scheduled data index information, the home computing node to process the to-be-processed characteristic data.

2. The distributed processing system of claim 1, wherein the control node is further configured to communicate with a configuration update node configured to store the to-be-processed characteristic data reported by the terminal and monitor updates to the to-be-processed characteristic data, wherein the control node is further configured to:
    receive, in response to detection that the to-be-processed characteristic data is updated, the type and the characteristic identifier of the to-be-processed characteristic data that are pushed by the configuration update node.

3. The distributed processing system of claim 1, wherein the first computing node is further configured to:
    process the characteristic data reported by the terminal and the characteristic data allocated by the control node; and
    push the processed characteristic data to the second computing node according to a subscription request of the second computing node.

4. The distributed processing system of claim 3, wherein the distributed processing system comprises a plurality of second computing nodes, wherein at least one of the plurality of second computing nodes is configured to:
    process the characteristic data pushed by the first computing node and the characteristic data allocated by the control node; and
    push the processed characteristic data to another second computing node according to a subscription request of the another second computing node.

5. The distributed processing system of claim 1, wherein the control node is further configured to:
    in response to determination that the processing process on the home computing node is abnormal based on a measured efficiency of the home computing node, obtain the type and the characteristic identifier of characteristic data associated with the processing process.

6. The distributed processing system of claim 1, wherein to determine the process index information, the control node is further configured to:

identify a correspondence between the characteristic identifier and the process index information; and select the process index information corresponding to the characteristic identifier.

7. The distributed processing system of claim 1, wherein the distributed processing system further comprises a storage node, the storage node configured to store the processed characteristic data, wherein the characteristic data is organized on the storage node based on a data storage format indicative of a version number, bit information, and data content.

8. The distributed processing system of claim 1, wherein the home computing node comprises the first computing node, the control node is further configured to:

calculate an efficiency metric of the first computing node;

determine that the processing process on the first computing node is abnormal based on the efficiency metric;

obtain, in response to determination that the processing process on the first computing node is abnormal, the type and the characteristic identifier of characteristic data processed by the processing process on the first computing node;

schedule, by the control node, the data index information corresponding to the to-be-processed characteristic data for processing by a separate processing process on the second computing node according to the process index information; and cause, based on the data index information, the second computing node to process the to-be-processed characteristic data to obtain processed characteristic data.

9. A data processing method, comprising:

obtaining, by a control node, a type and a characteristic identifier of to-be-processed characteristic data, the type being used for identifying a home computing node of the to-be-processed characteristic data, the home computing node being an identified one of a first computing node or a second computing node, the first computing node being configured to process characteristic data reported by a terminal and characteristic data allocated by the control node, and the second computing node being configured to process characteristic data generated by the first computing node and the characteristic data allocated by the control node;

determining, by the control node, process index information according to the characteristic identifier, the process index information indicative of a processing process to which the to-be-processed characteristic data belongs on the home computing node; and scheduling, by the control node, data index information corresponding to the to-be-processed characteristic data for processing by the processing process on the home computing node according to the process index information; and causing, based on the data index information, the home computing node to process the to-be-processed characteristic data to obtain processed characteristic data.

10. The method of claim 9, wherein the obtaining, by a control node, the type and the characteristic identifier of to-be-processed characteristic data further comprises:

receiving, by the control node from a configuration update node configured to detect that the to-be-processed characteristic data is updated, the type and the characteristic identifier of the to-be-processed characteristic data communicated by the configuration update node.

11. The method of claim 9, wherein the obtaining, by the control node, the type and the characteristic identifier of to-be-processed characteristic data further comprises:

obtaining, by the control node, in response to determination that the processing process on the home computing node is abnormal based on a measured efficiency of the processing process, the type and the characteristic identifier of the to-be-processed characteristic data.

12. The method of claim 9, wherein the determining, by the control node, the process index information based on the characteristic identifier further comprises:

determining, by the control node in response to identification of a correspondence between the characteristic identifier and the process index information, the process index information corresponding to the characteristic identifier.

13. The method of claim 9, wherein the processed characteristic data is stored in a data storage format of a version number, bit information, and data content.

14. The method of claim 9, wherein the home computing node comprises a first computing node, the method further comprising:

calculating an efficiency metric of the first computing node;

determining that the processing process on the first computing node is abnormal based on the efficiency metric;

obtaining, in response to determination that the processing process on the first computing node is abnormal, the type and the characteristic identifier of characteristic data processed by the processing process on the first computing node;

scheduling, by the control node, the data index information corresponding to the to-be-processed characteristic data for processing by a separate processing process on the second computing node according to the process index information; and causing, based on the data index information, the second computing node to process the to-be-processed characteristic data to obtain processed characteristic data.

15. A non-transitory computer readable storage medium comprising instructions executable by a processor, the instructions including:

instructions executable by the processor to obtain a type and a characteristic identifier of to-be-processed characteristic data, the type being used for identifying a home computing node of the to-be-processed characteristic data, the home computing node being an identified one of a first computing node or a second computing node, the first computing node being configured to process characteristic data reported by a terminal and characteristic data allocated by a control node, and the second computing node being configured to process characteristic data generated by the first computing node and the characteristic data allocated by the control node;

instructions executable by the processor to determine process index information according to the characteristic identifier, the process index information indicative of a processing process to which the to-be-processed characteristic data belongs on the home computing node;

instructions executable by the processor to schedule data index information corresponding to the to-be-processed characteristic data for processing by the processing process on the home computing node according to the process index information; and instructions executable by the processor to cause, based on the scheduled data index information, the home computing node to process the to-be-processed characteristic data to obtain processed characteristic data.

16. The non-transitory computer readable storage medium of claim 15, wherein the instructions executable by the processor to obtain the type and the characteristic identifier of to-be-processed characteristic data further comprise:
instructions executable by the processor to receive, by the control node from a configuration update node configured to detect that the to-be-processed characteristic data is updated, the type and the characteristic identifier of the to-be-processed characteristic data communicated by the configuration update node.

17. The non-transitory computer readable storage medium of claim 15, wherein the instructions executable by the processor to obtain the type and the characteristic identifier of to-be-processed characteristic data further comprise:
instructions executable by the processor to obtain, in response to determination that the processing process on the home computing node is abnormal based on a measured efficiency of the processing process, the type and the characteristic identifier of characteristic data processed by the processing process.

18. The non-transitory computer readable storage medium of claim 15, wherein the instructions executable by the processor to determine process index information according to the characteristic identifier further comprise:
instructions executable by the processor to determine, in response to identification of a correspondence between the characteristic identifier and the process index information, the process index information corresponding to the characteristic identifier.

19. The non-transitory computer readable storage medium of claim 15, wherein the processed characteristic data is stored according to data storage format indicative of a version number, bit information, and data content.

20. The non-transitory computer readable storage medium of claim 15, further comprising:
instructions executable by the processor to calculate an efficiency metric of the first computing node;
instructions executable by the processor to determine that the processing process on the first computing node is abnormal based on the efficiency metric;
instructions executable by the processor to obtain, in response to determination that the processing process on the first computing node is abnormal, the type and the characteristic identifier of characteristic data processed by the processing process on the first computing node;
instructions executable by the processor to schedule the data index information corresponding to the to-be-processed characteristic data for processing by a separate processing process on the second computing node according to the process index information; and
instructions executable by the processor to cause, based on the data index information, the second computing node to process the to-be-processed characteristic data to obtain processed characteristic data.

* * * * *